US011806618B2

(12) United States Patent
Soon-Shiong et al.

(10) Patent No.: US 11,806,618 B2
(45) Date of Patent: *Nov. 7, 2023

(54) LATENCY MANAGEMENT IN AN EVENT DRIVEN GAMING NETWORK

(71) Applicant: Nant Holdings IP, LLC, Culver City, CA (US)

(72) Inventors: Patrick Soon-Shiong, Los Angeles, CA (US); John Wiacek, Los Angeles, CA (US); Nicholas J. Witchey, Laguna Hills, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/817,672

(22) Filed: Aug. 5, 2022

(65) Prior Publication Data
US 2023/0083824 A1 Mar. 16, 2023

Related U.S. Application Data

(63) Continuation of application No. 17/653,153, filed on Mar. 2, 2022, now Pat. No. 11,433,301, which is a (Continued)

(51) Int. Cl.
*A63F 13/358* (2014.01)
*H04L 69/28* (2022.01)
(Continued)

(52) U.S. Cl.
CPC .......... *A63F 13/358* (2014.09); *A63F 13/216* (2014.09); *A63F 13/65* (2014.09);
(Continued)

(58) Field of Classification Search
CPC ...... A63F 13/358; A63F 13/216; A63F 13/65; H04L 7/0041; H04L 43/08; H04L 43/16; H04L 67/38; H04L 69/28
See application file for complete search history.

(56) References Cited

U.S. PATENT DOCUMENTS 7,525,973 B1  4/2009  McRae
7,715,419 B2  5/2010  Tatar et al.
(Continued)

OTHER PUBLICATIONS

Smarter Timing Solutions "Timing Accuracy" EndRun Technologies, Smarter Timing Solutions; available at https://endruntechnologies.com/products/time-frequency/timing-accuracy; printed Jul. 14, 2020.
(Continued)

*Primary Examiner* — Yingchuan Zhang
(74) *Attorney, Agent, or Firm* — Sheridan Ross, PC

(57) ABSTRACT

One exemplary aspect relates to normalizing latency in a networking environment to reduce the chances of creating an unfair advantage. While an exemplary aspect will be discussed in relation to a gaming environment, it is to be appreciated that the techniques disclosed herein can be applied to other environments where latency normalization or the ability to maintain latency between various endpoints is desired. For example, other environments include eSporting, on-line betting, fantasy esports, streaming services, etc. Some more specific examples include World of Warcraft®, Overwatch®, H1Z1®, PUBG®, Fortnite®, Realm Royale®, Planet Side 2®, real-time strategy games, slot machines, electronic poker tournaments, etc.

20 Claims, 4 Drawing Sheets

Related U.S. Application Data continuation of application No. 17/454,350, filed on Nov. 10, 2021, now Pat. No. 11,291,912, which is a continuation of application No. 16/931,837, filed on Jul. 17, 2020, now Pat. No. 11,198,062.

(60) Provisional application No. 62/875,577, filed on Jul. 18, 2019.

(51) Int. Cl.

| | |
|---|---|
| *A63F 13/65* | (2014.01) |
| *H04L 43/16* | (2022.01) |
| *H04L 7/00* | (2006.01) |
| *A63F 13/216* | (2014.01) |
| *H04L 43/08* | (2022.01) |
| *H04L 67/131* | (2022.01) |

(52) U.S. Cl.
CPC ............ *H04L 7/0041* (2013.01); *H04L 43/08* (2013.01); *H04L 43/16* (2013.01); *H04L 67/131* (2022.05); *H04L 69/28* (2013.01)

(56) References Cited

U.S. PATENT DOCUMENTS

| | | |
|---|---|---|
| 9,917,728 B2 | 3/2018 | Wittenschlaeger |
| 10,505,651 B1 | 12/2019 | Garrett |
| 11,198,062 B2 | 12/2021 | Soon-Shiong et al. |
| 11,291,912 B2 | 4/2022 | Soon-Shiong et al. |
| 2006/0039369 A1 | 2/2006 | Perera et al. |
| 2013/0094498 A1 | 4/2013 | Wittenschlaeger |
| 2013/0101291 A1 | 4/2013 | Wittenschlaeger |
| 2015/0200873 A1 | 7/2015 | Wittenschlaeger |
| 2015/0208196 A1 | 7/2015 | Nigam |
| 2017/0232340 A1 | 4/2017 | Lockton |
| 2018/0091384 A1 | 3/2018 | Charnock et al. |
| 2018/0254841 A1 | 9/2018 | Nannra et al. |
| 2018/0332546 A1 | 11/2018 | Aoki |
| 2019/0321725 A1 | 10/2019 | Zimring et al. |
| 2022/0184495 A1 | 6/2022 | Soon-Shiong |

OTHER PUBLICATIONS

Van Allen, Eric "Big Data is the Future of Esports" Esports; Available at https://compete.kotaku.com/big-data-is-the-future-of-esports-1827206481; Jun. 29, 2018.

Official Action for U.S. Appl. No. 16/931,837, dated Nov. 4, 2020 13 pages.

Final Action for U.S. Appl. No. 16/931,837, dated Jan. 29, 2021 11 pages.

Official Action for U.S. Appl. No. 16/931,837, dated Apr. 27, 2021 15 pages.

Notice of Allowance for U.S. Appl. No. 16/931,837, dated Aug. 12, 2021 9 pages.

Notice of Allowance for U.S. Appl. No. 17/454,350, dated Jan. 5, 2022 6 pages.

Notice of Allowance for U.S. Appl. No. 17/653,153, dated Apr. 28, 2022 9 pages.

LATENCY MANAGEMENT IN AN EVENT DRIVEN GAMING NETWORK

CROSS REFERENCE TO RELATED APPLICATIONS

This application is a continuation of U.S. patent application Ser. No. 17/653,153, filed Mar. 2, 2022, now U.S. Pat. No. 11,433,301, which is a continuation of U.S. patent application Ser. No. 17/454,350, filed Nov. 10, 2021, now U.S. Pat. No. 11,291,912, which is a continuation of U.S. patent application Ser. No. 16/931,837, filed Jul. 17, 2020, now U.S. Pat. No. 11,198,062, which claims the benefit of and, under 35 U.S.C. § 119(e), priority to U.S. Provisional Patent Application No. 62/875,577, filed Jul. 18, 2019, entitled "LATENCY MANAGEMENT IN AN EVENT DRIVEN GAMING NETWORK," each of which are incorporated herein by reference in their entirety.

FIELD

One exemplary aspect is related to management of latency in network environments, especially in gaming or eSporting environments.

BACKGROUND

As the gaming and eSporting industry has grown, it has uncovered several pain points with respect to the technologies uniquely associated with eSports. eSports are typically centered on game players competing with each other within a video game that is not necessarily directly visible to spectators as in arena sports. Unfortunately, due to the internal computing nature of the games, the industry has had to develop different viewing formats for spectators from viewing formats of traditional sporting events. Specifically, eSporting events are transmitted or otherwise broadcast gaming data to spectators in an arena on large video displays or over Internet streaming services (e.g., Twitch.tv®, YouTube Live®, etc.) rather than merely televising events. However, the Internet is notorious for networking issues that can impact a viewer's experience with the transmitted data. For example, spectators/viewers distributed throughout the world and viewing an eSports gaming event will experience various latency delays in reception of their streams where the latency is incurred due to the distance from the source of the stream or due to the various intermediary Internet infrastructure (e.g., routers, switches, fire walls, virus detection applications, malware detection applications, governmental devices, etc.) between the source the spectator.

Ordinarily latency would not impact spectators in a significant manner because spectators are passive participants in the eSporting event and the viewing experience of one spectator does not impact another spectator's experience. Thus, differences in latency among the spectators goes unnoticed and does not impact each individual's experience. However, as eSporting has grown, the ability to gamble on such events has also become available and popular. In such scenarios where spectators can be considered actively engaged with an event, differences in latency can be have dramatic, financial impact. For example, if spectators are wagering on an in-game event such as associated with two opposing players achieving a goal (e.g., capture the flag, etc.) by a certain time, spectators having low latency will have more advantage in placing or managing their wagers relative to spectators having high latency. Therefore, the spectators are not necessarily participating on the same level playing field.

Interestingly, there is no known effort in video game eSporting industry to control latency differences among spectators in a fine grain or other manner. Rather, the eSporting industry simply publishes real-time metrics in a similar fashion as traditional sports. In view that players participate in a digital environment, there is a need to quantify, track, detect, or otherwise manage in-game events with which spectators can actively interact (e.g., engage players, wager, etc.). By defining and managing dissemination of fine grained in-game events, issues related to disparity in latency among participating spectators can be mitigated as describe herein.

SUMMARY

One exemplary aspect relates to normalizing latency in a networking environment, especially in a gaming or eSporting environment, to reduce the chances of creating an unfair advantage of one spectator's/viewer's participation relative to other spectators/viewers.

While an exemplary aspect will be discussed in relation to a gaming environment and eSporting, it is to be appreciated that the techniques disclosed herein can be applied to other environments where latency normalization or the ability to maintain latency between various endpoints is desired. For example, other environments include eSporting, on-line betting, fantasy esports, streaming services, etc. Some more specific examples include World of Warcraft®, Overwatch®, H1Z1®, PUBG®, Fortnite®, Realm Royale®, Planet Side 2®, real-time strategy games, slot machines, electronic poker tournaments, etc.

Endpoints include any type of electronic device including but not limited to personal computers, laptops, tablets, gaming machines, gambling machines, wearables, gaming consoles, server(s), smartphones, mobile devices, etc.

While an exemplary embodiment will show some of the components collocated, it is to be appreciated that any of the components can be located at any location within the system, and one or more of the components can optionally be duplicated in any one or more portions of the latency system. For example, respective GPS units could be located at each of the endpoints and the gaming engine(s).

As eluded to above, one problem exists in that for various reasons connections to endpoints from a common location can have different communications path latencies. Communications path latencies between endpoints can also vary for many of the same reasons. A non-exhaustive list of the reasons can include communications service type (e.g., DSL, fiber, wireless, etc.), communications service provider, communications service speed tier, problems with the communications channel, endpoint hardware capabilities, available bandwidth, packet routing, time of the day, data type, interference, etc.

In gaming environments where video game live streaming occurs, the video streams of the players are provided over a digital network to many remote viewers or spectators or users (these terms are used interchangeably herein), i.e., multicast. The remote viewers can experience significant latency relative to each other due to differences in their networking infrastructure and/or due to any one or more of the reasons discussed above. When the viewers are merely viewing a broadcast, such latency variations are not necessarily an issue. However, in environments where latency is critical such as eSporting events where remote viewers can place wagers on events in the eSporting activity, latency can be a problem because differences in latencies can give rise to unfair advantages. A need for latency management in a networking environment, such as a network gaming environment is needed.

In accordance with one exemplary aspect, the system can start by allowing one or more entities (e.g., admins) to define an in-game or in-activity event. The in-game event can have multiple attributes that could include both in-game attributes as well as optional metadata attributes. As the event evolves, an optional ticker can show the status of the event. For example, an in-game event could be the first player to reach a number of "kills" or types of "kills". Naturally, the in-game event could be quite complex and can be linked with a multiple or a combination of events. Once defined, the in-game event can be presented to viewers/spectators for optional betting. Odds can be presented, optionally based on previous data or other information and collected and analyzed automatically. Alternatively, or in addition, player stats can be used to determine relative odds and the odds can change as event evolves.

The data for an event that is latency sensitive is presented to all viewers at the same time to ensure fairness. This can be achieved by measuring latency to all or relevant remote sites or endpoints associated with the respective spectator. This latency can be measured using existing techniques such as ping times, NTP (Network Time Protocol), NetFlow analyzer, traceroute, etc. To ensure better synchronization among viewers, each remote site (endpoint) can be equipped with GPS system that maintains a local real-time clock. This permits all sites to operate on nearly the exact time, to within about 100 ns (See, for example, URL www.endruntechnologies.com/timingspec.htm). The system could then, for example, normalize the latencies by resolving to the highest latency among the viewers, among other possible latency management techniques. Optionally, content, e.g., events, may not be provided to some users if the latency is above a threshold which would, for example, cause a negative user experience for the other viewers.

Latency guarantees could also be provided as, for example, part of a QoS (Quality of Service) agreement with the spectators/users. In some embodiments, it is possible for viewers to purchase or subscribe to low latency communication channels. Thus, the network can be provisioned based on, for example, latency, QoS, or other factors. For example, the latency management techniques disclosed in US2006/0039369A1, which is incorporated herein by reference in its entirety, can be adapted to ensure spectators experience common latency or the latency does not impact interactions with gaming events. Further, examples for provisioning networks can be found in U.S. Pat. No. 7,525,973B1, and U.S. Pat. No. 7,715,419B2, which are incorporated herein by reference in their entirety.

Optionally further, bets or other interactions with the event(s) or correlated to the events can be logged into a blockchain, ledger, notarized ledger or distributed ledger type system. This can be centralized or could be distributed among subscribers/spectators. That is, the subscribers/spectators could be nodes on a peer-to-peer distributed ledger processing system.

As the in-game event evolves, the data, e.g., events, are sent to the remote viewers. It should be appreciated that in some cases, the data might be purposely delayed ensuring everyone receives the data at the same time. In some case, the event data can be encrypted to prevent viewing by "man in the middle".

When an event pays out, the data can be logged, leader boards updated, and notices sent. The resulting data could also be stored in a "big data" store and/or in the distributed ledger system.

Of particular interest, the data from such betting systems can be used as a valuable property. The data can be used for artificial intelligence (AI) training data, can be used as marking information, can be used by game developers to determine which features are most interesting to remote viewers, a measure of excitement level, etc., just to name a few. The betting can also be used to steer behavior in the game, incentivize game-play, reward players, increase viewer participation, etc.

Additional aspects are directed toward software tools that aid in the creation and management of venues and/or game events and the associated infrastructure need to support such venues/events.

Additional aspects are directed toward integrated development environments (IDEs) or game engines through which eSporting games (e.g., H1Z1®, league of Legends®, etc.) can incorporate hooks for betting and/or other interaction. In addition to betting, other types of incentives or "bounty" could be associated with an event. This bounty could be based directly on game play, and/or bounty based on one or more viewers creating a bounty to enhance game-play. For example, if one or more viewers wish to incentivize a type of behavior, e.g., capture a castle, the viewers/users could create an in-game bounty to encourage this behavior from the players. Any one or more aspects of this bounty could then be stored in the distributed ledger system.

Additional aspects are directed toward determining whether local versus remote processing of gaming data has advantages and/or can address or partially address latency challenges. For example, it may be advantageous to save bandwidth and perhaps improve latency if a centralized game engine processes the gaming data. In this context, the local gaming device could assume a display only type of role for the gaming data and allow the centralized gaming engine to perform the processing. This configuration could optionally be automatically implemented when a high latency connection is detected.

Additional aspects are directed toward devices that connect to such networks and their various topologies that support the system: any one or more of these topologies can be used hub spoke, star, wagon wheel, hybrid, etc.

Additional aspects relate to correlating an event to specified latency criteria, then enforcing the latency criteria with respect to the viewers/spectators, especially with respect to betting.

As is to be appreciated, the systems disclosed herein can work with mobile, console, tablet, PC and comparable based systems. One aspect evaluates the different types and latencies of the communication channel(s) available to the gaming device, and can make recommendations and/or automatically switch to a communication channel with a certain maximum latency. For example, a mobile device may have available a 4G connection, three different WiFi networks and a 5G connection. A latency evaluation tool can measure latency of each available communication path to, for example, a central gaming server to see which is best for the particular game being played or activity that the spectator would like to engage in. The game can then direct the mobile device to switch to the best communications channel(s) for that game. This process can also be dynamic and performed at any time and/or for a specific event or even during an event(s).

Networks could also be configured to offer redundancy to guarantee latency measures should a path fail. This could be included in a tiered pay-for-service type of configuration and/or could be awarded based on a spectator's achievements.

An additional aspect relates to updating existing streaming services to support gambling and/or in game betting. (e.g., TwitchTV®, YouTube Live®) As with the other aspects, bets could be placed on one or more events with aspects of the bet optionally stored in a distributed ledger system.

An additional aspect provides leader boards that show venue to venue competitions and associated data. Similarly, the system can display tickers for events (local or remote) and can optionally be configured to support Fantasy eSports (i.e., the fantasy sports version of traditional sports). This could be coupled with supporting metadata, for example betting on specific play actions, which can be captured via clickstreams. This concept of capturing and/or management of clickstreaming data can be extended to any aspect of game-play and/or event interaction. For example, when a user or spectator makes a bet on an event, clickstream data including metadata associated with the event can be stored and communicated to a centralized gaming server and/or stored in a distributed ledger system.

Additional aspects allow wagers to be fed-back to the players as a reward. For example, as viewers bet, the bets create an in-game incentive for the game players to achieve desired objectives. One example would be to perhaps place a bounty on a specific player. Or perhaps capture an opposing side's castle, etc. Once the object is achieved, the wager can be rewarded to the player who achieved the objective.

Further aspects relate to events which do not necessarily have to be displayed as actual, real-time game footage, but could just be a ticker, score, or other representation of the game play. By focusing on the events, we can decouple the game play data from other delivered data to a viewer/spectator within the latency constraints discussed herein. In other words, relevant event data can optionally be isolated and sent to the viewer out-of-band relative to other normal, uninteresting (relative to the event) game data.

BRIEF DESCRIPTION OF THE FIGURES

For a more complete understanding of the present disclosure and its advantages, reference is now made to the following description taken in conjunction with the accompanying drawings, in which like reference numerals represent like parts.

DESCRIPTION OF EMBODIMENTS

In this detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Figure 1:
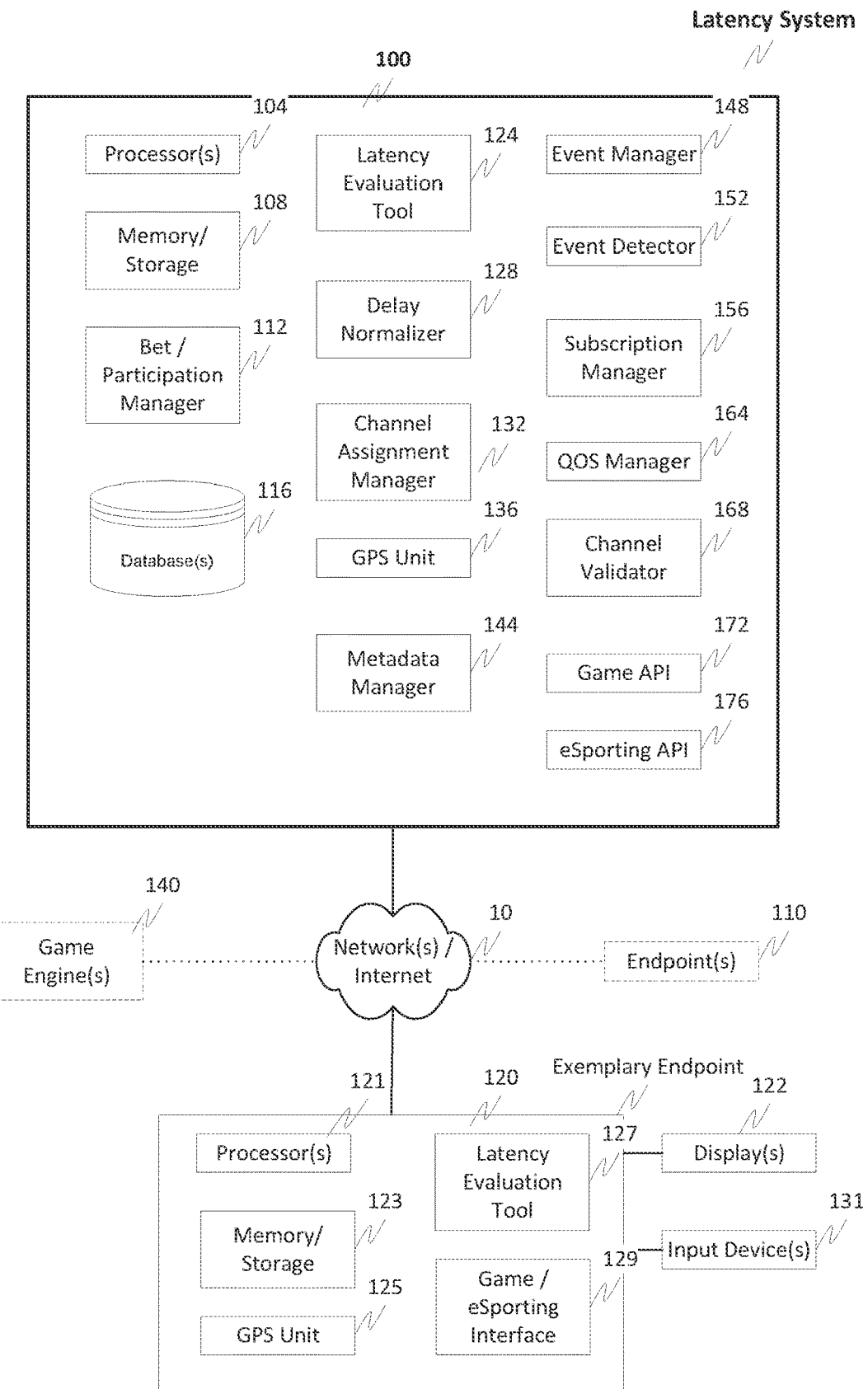
FIG. 1 illustrates an exemplary communications environment and various endpoints according to one exemplary aspect.

FIG. 1 illustrates an exemplary networking environment with a latency system and a plurality of endpoints. Specifically, a latency system 100 is connected via one or more networks 10 to one or more endpoints 110-120 and/or gaming engines 140 and/or betting servers (not shown).

The latency system comprises one or more processors 104, memory/storage 108, bet/participation manager 112, one or more databases 116, a latency evaluation tool 124, a delay normalizer 128, a channel assignment manager 132, a GPS (Global Positioning System) unit 136, a metadata manager 144, an event manager 148, an event detector 152, a subscription manager 156, a QoS manager 164, a channel validator 168, a game API 172 and an eSporting API, all connected via one or more wired or wireless links.

The network 10 can be one or more of wired or wireless networks such as a LAN, WAN, the internet, or any combination thereof. Additionally, any portion of the network can be a secured network. As is known, the network includes a plurality of communications channels (not shown) over which the various elements communicate. These communications channels can each have a different latency and are the subject of this disclosure.

The endpoints, such as endpoints 110 and 120, etc., include a processor(s) 121, memory/storage 123, GPS unit 125 (from which accurate time data is obtained), latency evaluator 127 and game/eSporting (or other) interface 129. The endpoint 120 can be connected to a display 122 and input device(s) 131 such as a mouse/keyboard. As discussed, the endpoints can also optionally include any of the components of the latency system 100. Similarly, the game engine 140 and betting server(s) (not shown), in addition to well-known components, can include any one or more components of the latency system 100 and endpoint 120.

In operation, the latency evaluation tool 124, cooperating with the subscription manager 156, which tracks spectators/users, is able to determine latency of the communication channel associated with each user. As discussed, this can be performed using existing techniques such as ping times, NTP (Network Time Protocol), NetFlow analyzer, traceroute, etc. To ensure accurate latency assessment, each remote site (endpoint) can be optionally be equipped with the GPS unit 125 that maintains a local real-time clock. This permits all sites to operate on nearly the exact same time, with this synchronized timing data available to further assist with latency determinations and measurements.

In accordance with a first embodiment, the latency measurement is performed when a spectator joins a game. This latency measurement can be recorded and stored with information about the communications channel connecting the devices. Should the communications channel change, an updated latency measurement could be performed. Data packets sent to the spectators can optionally include data to calculate timing and latency information for measuring performance of the communication channels, providing constant data and statistics information about the communication channel. That way all aspects of the game are optionally normalized to the spectator with the greatest latency as discussed hereinafter. (Limits, as discussed, can be imposed on acceptable latencies)

Appreciating that there may be different ranges of latencies, groupings of spectators can be created that have latencies within a certain range. By grouping similar latency spectators in this manner, the delay normalizer 128 will be able to introduce smaller delays to normalize latencies for spectators in the group. This could improve game play experience as perceived delays by spectators could be reduced.

In accordance with another aspect, the event manager 148 and event detector 152 notify the latency evaluation tool when a latency sensitive event is about to occur. For example, the event manager can maintain data (such as metadata) about the specifics of an event within a gaming environment such as the type of event, the maximum allowed latency associated with the event, value of the event, etc., and in general any information about the event. The event detector 152 can cooperate with the game API/eSporting API (172/176) and monitor game play and detect when a spectator engages or is about to engage with an event(s). Prior to allowing the spectator to perform the event, the latency evaluation tool 124 can perform a latency check to ensure the spectator has an acceptable latency for the event.

When the spectator has an acceptable latency, the spectator is allowed to proceed with engaging the event, however, the system with the delay normalizer 128 may delay the event as discussed hereinafter.

If the spectator is determined to not have an acceptable latency, a plurality of optional actions can be taken. First, the subscription manager 156 could optionally offer the spectator a different tier of service (optionally at a cost) to try and resolve the latency problem. For example, the channel validator 168 cooperating with the latency evaluation tool 124 could test available communications channels to the endpoint. This could be performed by one or more of the latency system 100 and the endpoint 120. For example, the endpoint may have information (available WiFi networks, data limit information for 4G, 5G, etc.,) that should be taken into account when evaluating alternatives to the current communications channel. The latency management systems could even offer incentives to user/spectators be the hotspot other user/spectators for an optional cost, these incentives could be monetary, in support of enabling a game format or team spirit, just to name a few.

With the cooperation of the processor, a determination could be made as to whether any of the alternative channels evaluated by either device are an improvement and an alternative option over the current channel. If so, this information could be stored in the subscription manager and communicated to the user with the user able to select one of these alternative channels.

Optionally, if no lower latency channels are available, the user could be informed they will not be allowed to participate in the event. Optionally still, the user could be provided with one or more non-latency sensitive events as an alternative to the latency sensitive event that they are not allowed to participate in.

Optionally, information regarding the latency measurements can be provided to the user such that the user could use this information and work with their internet service provider to try and resolve the latency problems.

When the latency is at an acceptable level, the delay normalizer 128 with the processor 104 and memory 108 determine the user with the greatest latency. As discussed, this can be for all users or a subset of the users (group). The user with the highest latency is set as the baseline, and the delay normalizer 128 cooperating with the appropriate API, event manager 148 and storage delay (cache) the delivery of any latency sensitive events by an amount such that all users receive the latency sensitive event at the same time. The channel validator 168 and GPS unit 136 can record the delivery time (delivery timestamp) of the event and ensure the event arrived at all users at the same time. This validation information can optionally be used as feedback to adjust delays for future events. As discussed, this delivery, event and timing information as well as clickstream can also be stored on a distributed ledger, or other storage device especially in the event of the event being a betting type of event. It is possible that latency cannot be normalized to an acceptable level. This creates an opportunity for other forms of normalizing the playing field for the spectators that are betting. The odds calculation could optionally be adjusted based in differences in latencies where people having high latency might have more favorable odds (e.g., larger payout in exchange for greater risk to the bet based on latency measurement). Those betters having lower latency might have their bets held in escrow until all or most bets are received.

While the event itself can be delayed, each respective user experience can also be delayed in its entirety to correct for the differences in latencies. Thus, the latency system 100 can be equipped with a storage 108 appropriate to cache the streams of data for each user up to the determined delay amount. As this could amount to a significant amount of storage, grouping users together with similar latencies could help improve efficiencies and reduce the amount of storage required.

The channel assignment manager 132 can be used to assist with the grouping of users into similar latency groups. By assigning channels to users with latencies within certain ranges, the delivery of gaming stream data can be simplified, and efficiencies improved.

The metadata manager 144 can cooperate with any one or more of the other elements in managing metadata that could be associated with the function(s) performed by that element. For example, each event could have associated metadata that is relevant to many of the other functions being performed by the latency system 100. The metadata manager 144 makes this metadata readily available as needed to assist with these functions.

The endpoint 120 can have a latency evaluation tool 127 that performs in a similar manner to the one associated with the latency system 100. The endpoint 120 can also have a gaming interface 129 with game/eSporting information such as a game stream displayed on display 121. The endpoint 120 can receive inputs from the input devices 123 such as inputs in response to an event. As discussed, this clickstream and/or keyboard inputs can be recorded with metadata associated with the event.

The GPS unit 125 can monitor and record timestamp information that can be used to assist with the latency determination and/or validating of channel information. As GPS data is highly accurate, securing of this timestamp information can also be performed such as with encryption and/or on a secure data channel to assist with tamper prevention. This allows the channel validator 168 to accurately assess latency information.

Optionally, the time leading up to an event and/or the number of spectators and/or the values of the bets can be monitored, and latency rules/constraints adjusted. For example, as the event evolves, constrains on latency could optionally be tighter with corresponding notifications going to the spectators. The opposite is also true. For example, if leading up to an event, there are a number of spectators below a threshold, latency constraints could be relaxed to try and encourage more spectators to participate in the event. Similar adjustments to the latency constraints could be based on the betting value, or in general any metric, to enhance spectator participation or involvement.

Figure 3:
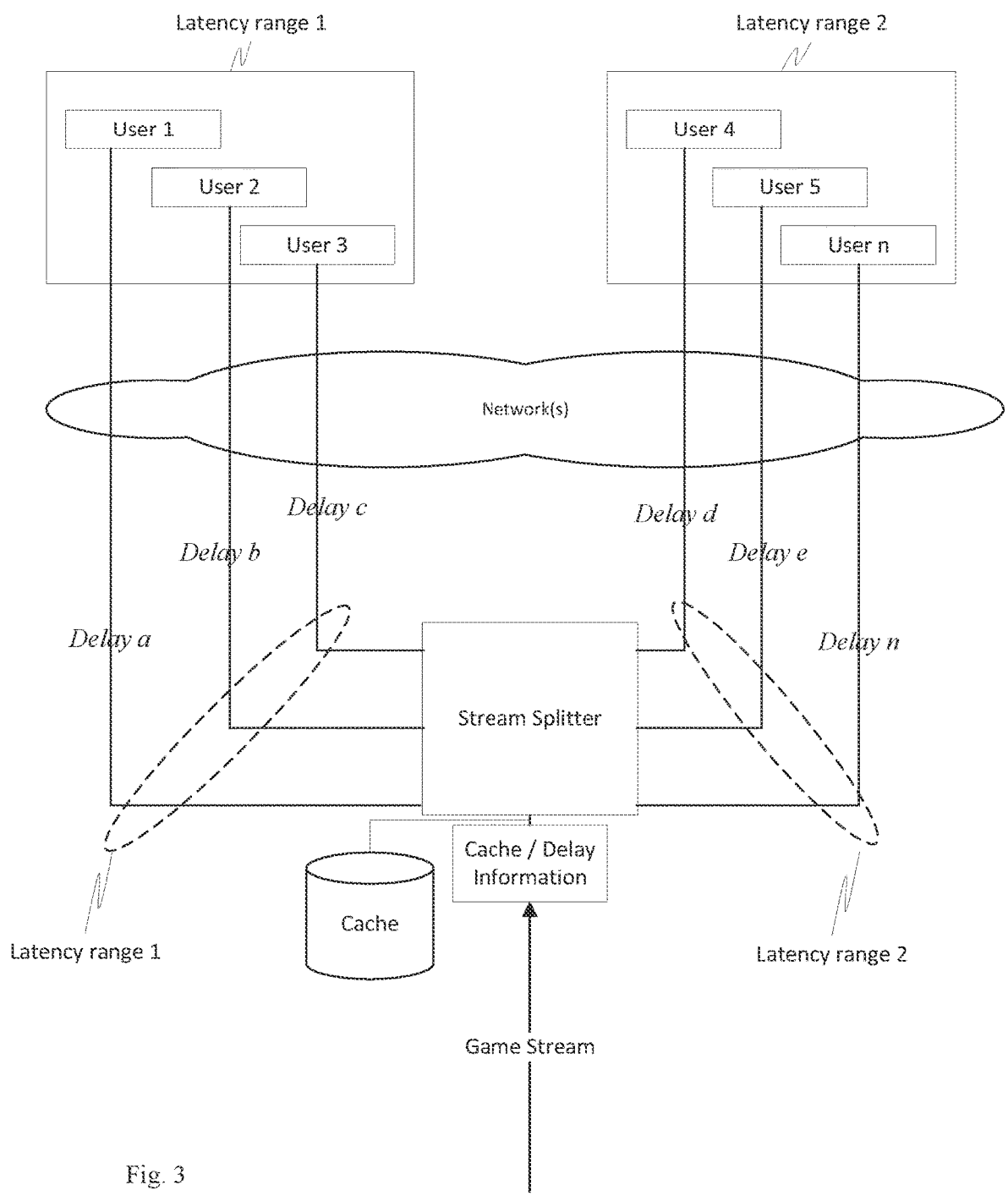
FIG. 3 graphically illustrates how the streams are split and time-synced for delivery to users.

FIG. 3 graphically illustrates how the streams could be split and time-synced for delivery to users. It is to be apperceived however that any values and any number of user and user groups could be used. In exemplary FIG. 3, there are n users that have been grouped into two latency groups. Users 1-3 have been grouped together in that their latencies are between 25 and 50 mS (latency range 1). Users 4-n have been grouped together in that their latencies are between 51 and 75 mS (latency range 2). The latencies for each respective user are stored in the cache delay information storage and provided to the stream splitter. In operation, a game stream (with latency sensitive events) is received by the stream splitter. The stream splitter can be multimedia stream splitter that duplicates the input game stream into a plurality of time-delayed streams. The cache/delay information stores the latency information for each respective user that is used by the stream splitter to delay the stream for each respective user based on that user's communication channel latency. Caching as necessary for each stream can be performed by the cache.

As discussed, there can be any number of groups, or no groups at all. Similarly, there can be any number of stream splitters, such as a separate stream splitter for each respective grouping. The stream splitter and cache on FIG. 3 could be one exemplary embodiment of the delay normalizer 128.

In accordance with any of the embodiments, the QoS manager 164 optionally in cooperation with the latency evaluation tool 124 and GPS unit 136 can ensure one or more QoS metrics such as latency are being maintained on the communications channel for any one or more of the users.

In addition to gaming information, the accurate synchronous delivery of any information can be ensured by the system. Such information includes but is not limited to game play information, chat information, betting information, portal information, streaming information, party information, option information, viewer information, and in general any information associated with the activity the user(s) is engaged in.

Figure 2:
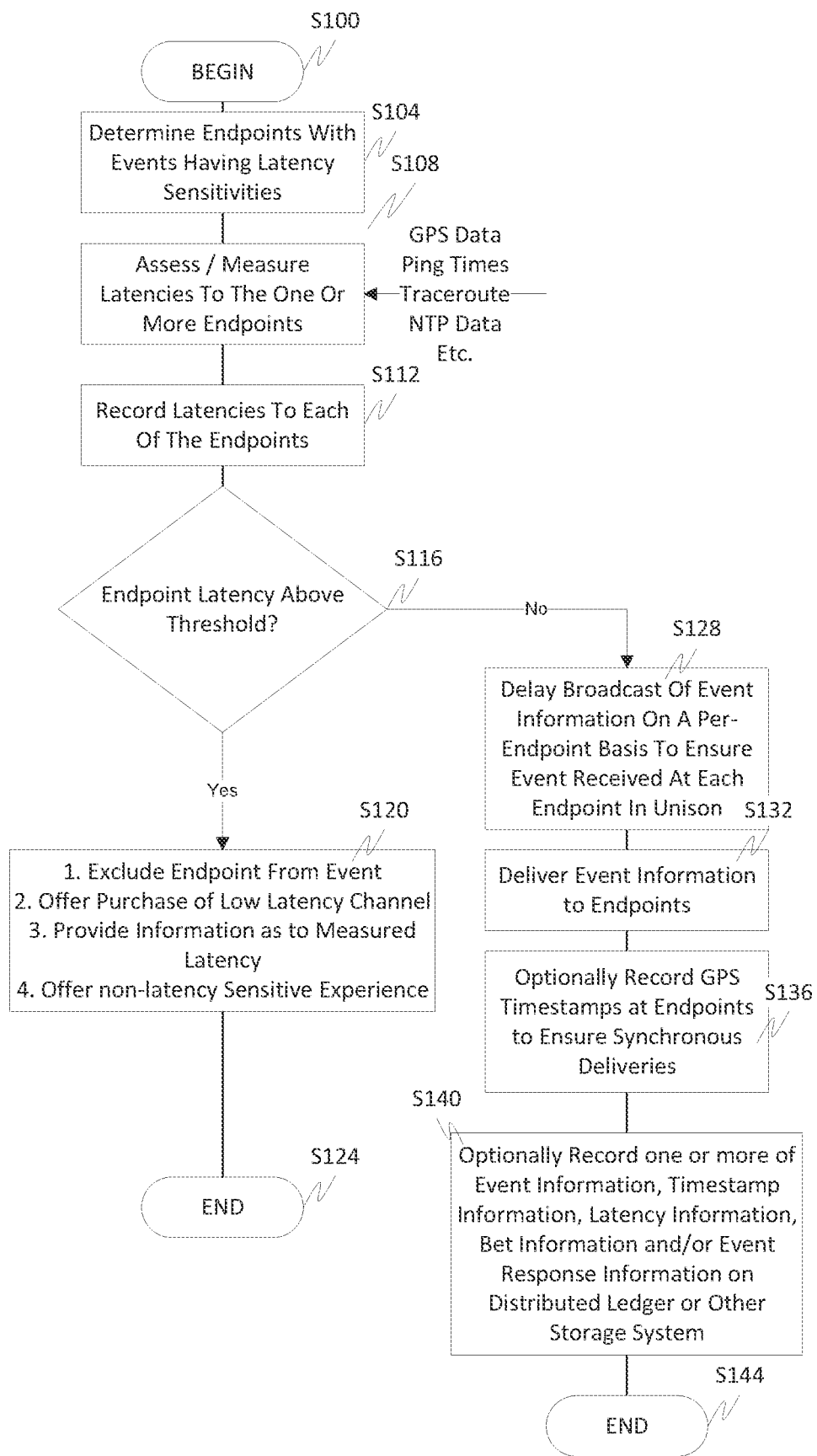
FIG. 2 is a flowchart illustrating an exemplary method for latency management.

FIG. 2 outlines an exemplary method of ensuring synchronous deliver of certain types of information. Control begins in step S100 and continues to step S104. In step S104, the one or more endpoints with events which are latency sensitive are determined and identified. Next, in step S108, the one or more identified endpoints have the latency thereto measured. As discussed, this can be performed using one or more of GPS time data (through a simple numerical comparison), ping times, traceroute information, NTP data, etc. Then, in step s112, the measured latencies are recorded. Control then passes to step S116.

In step S116, a determination is made regarding whether a measured latency is above a threshold. If above a threshold, control continues to step S120, otherwise control continues to step S128.

In step S120, a number of optional steps can be taken including: excluding the endpoint from the event, offering an upgrade to a low latency channel, providing information to the user about the measured latency, offering of an alternative non-latency sensitive experience, moving the user to another group, or the like. Control then continues to step S124 where the control sequence ends.

In step S128, to accurately deliver event information in a time-synchronized manner, the broadcast of one or more event information is delayed on a per-endpoint basis to ensure each endpoint receives the event information in unison. Next, in step S132, the event information is delivered to the endpoint(s). Then, in step S136, optional information such as GPS timing information can be recorded to memorialize the synchronous delivery. Control then continues to step S140.

In step S140, the system can optionally record one or more of event information, timestamp information, latency information, bet information and/or event response information on distributed ledger, a blockchain, locally, remotely, securely, the cloud and/or other storage system. Control then continues to step S144 where the control sequence ends.

Figure 4:
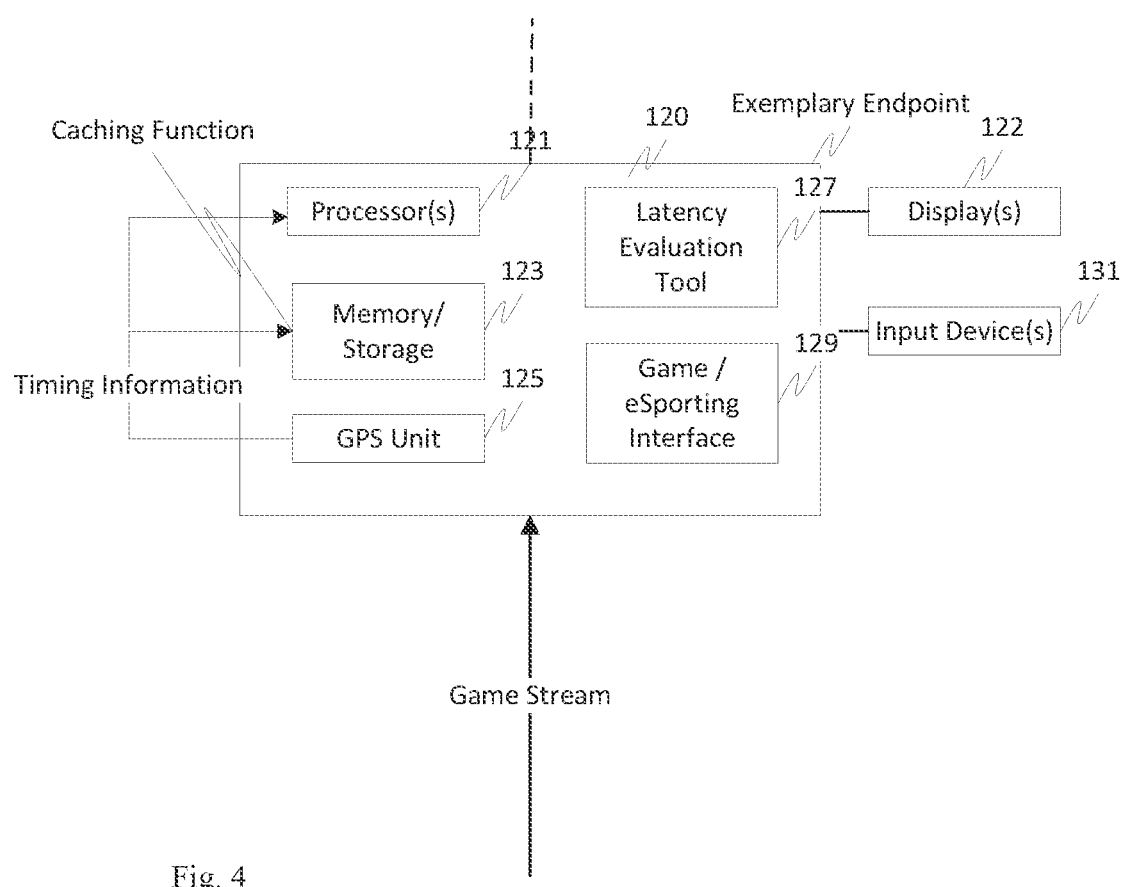
FIG. 4 illustrates another exemplary endpoint configuration in accordance with another optional embodiment.

FIG. 4 shows another optional embodiment where caching of the event data is distributed to the endpoint(s), and then the endpoint(s) control when the event is delivered.

For example, latency sensitive event data can be distributed to the one or more endpoints regardless of the latency of the communications channel associated with that endpoint. This latency sensitive event data is then cached in the storage 123 (optionally in a secured and/or encrypted manner). The latency sensitive event data can be accompanied by display time information that indicates the time an event can be presented to a user on the interface 129. One exemplary advantage of this configuration is that memory for caching is distributed among the endpoints and channel latencies become less relevant. Timing information from the GPS unit 125, is then used as the trigger which allows the processor 121 to deliver the event information to the interface 129. In one optional embodiment, the timing information is used with other encryption information to ensure the event data can not be seen by a user until the specified time the event is to be displayed. Similarly, the timing information from the GPS unit 125 can be secured to assist with tamper prevention. And this timing information could also be encrypted with, for example, a portion of a key sent with the event information.

Additionally or alternatively, a time stamped confirmation can be includes and sent as soon as the latency sensitive event data is presented to the user, this can be used in conjunction with other data from the network (routers, stream splitters, etc.) to validate that the event data information was presented to the user at the appropriate time.

Additionally or alternatively, when there is no GPS signal available, local beacons and/or alternative location providing systems that can provide timing information and a key that do not rely on satellite signals could be utilized. One such exemplary system is the Enhanced Link Navigation System (ELNS) that is being tested currently. The beacons are placed at desired locations and they will broadcast a key that can be used to open time sensitive event data or other time sensitive data.

Some embodiments may be used in conjunction with various devices and systems, for example, gaming or betting equipment, entertainment equipment, a wireless station (STA), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology-Telecommunications and information exchange between systems Local and metropolitan area networks-Specific requirements Part 11: Wireless LAN Medium Access Control (MAC) and Physical Layer (PHY) Specifications, Mar. 29, 2012; IEEE802.11ac-2013 ("IEEE P802.11 ac-2013, IEEE Standard for Information Technology-Telecommunications and Information Exchange Between Systems-Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmcTM/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology-Telecommunications and Information Exchange Between Systems Local and Metropolitan Area Networks-Specific Requirements Part 11: Wireless LAN Medium Access Control (MAC) and Physical Layer (PHY) Specifications-Amendment: Enhanced Throughput for Operation in License-Exempt Bands Above 45 GHz)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

Some demonstrative embodiments may be used in conjunction with a WLAN (Wireless Local Area Network), e.g., a Wi-Fi network. Other embodiments may be used in conjunction with any other suitable wireless communication network, for example, a wireless area network, a "piconet", a WPAN, a WVAN, and the like.

Some demonstrative embodiments may be used in conjunction with a wireless communication network communicating over a frequency band of 5 GHz and/or 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 GhH and 300 GHz, a WLAN frequency band, a WPAN frequency band, a frequency band according to the WGA specification, and the like.

While the above provides just some simple examples of the various device configurations, it is to be appreciated that numerous variations and permutations are possible. Moreover, the technology is not limited to any specific channels, but is generally applicable to any frequency range(s)/channel(s). Moreover, and as discussed, the technology may be useful in the unlicensed spectrum.

In the detailed description, numerous specific details are set forth in order to provide a thorough understanding of the disclosed techniques. However, it will be understood by those skilled in the art that the present techniques may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the terms "game" and "gaming," have an inclusive meaning to include all of the following: gambling, eSports, fantasy sports and video game industries; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The exemplary embodiments will be described in relation to computing and/or gaming systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, or within a dedicated secured, unsecured, and/or encrypted system and/or within a network operation or management device that is located inside or outside the network.

Thus, it should be appreciated that the components of the system can be combined into one or more devices, or split between devices. As will be appreciated from the following description, and for reasons of computational efficiency, the components of the system can be arranged at any location within the environment without affecting the operation thereof.

Furthermore, it should be appreciated that the various links, including the communications channel(s) connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

The exemplary embodiments are described in relation to enhanced communication delivery. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

Exemplary aspects are directed toward:

A communications system for delivery of latency sensitive events comprising:
   a processor;
   a memory;
   a latency evaluation tool, the latency evaluation tool and the processor performing a latency measurement over one or more networks to an endpoint;
   a storage connected to the latency evaluation tool that receives the latency measurement and stores the measurement with associated endpoint information;
   the processor determining a delay for information to be sent to the endpoint based at least on the measured latency;
   a delay normalizer connected to the storage that delays a delivery of the information to the endpoint based on the determined delay.

Any of the above aspects, wherein the information is a latency sensitive event.

Any of the above aspects, wherein the latency sensitive event is in one or more of a video game, a game, a betting environment, a gambling environment, and a streaming environment.

Any of the above aspects, wherein the latency measurement is performed for a plurality of endpoints, and endpoints are grouped together based on a similarity of the measured latency.

Any of the above aspects, further comprising a GPS unit that provides GPS-based time information, the GPS-based time information used for assessing latency.

Any of the above aspects, further comprising a GPS unit that provides GPS-based time information, the GPS-based time information recorded when the information is delivered to the endpoint.

Any of the above aspects, further comprising an event detector that detects one or more latency sensitive events from a game engine.

Any of the above aspects, wherein the latency measurement is performed with one or more of ping times, NTP (Network Time Protocol), NetFlow analyzer, traceroute, and GPS time data.

Any of the above aspects, further comprising a cache connected to the delay normalizer and processor to store the latency sensitive event unit a predetermined time, the predetermined time allowing synchronous delivery of the latency sensitive event to a plurality of endpoints.

Any of the above aspects, wherein an endpoint subscribes to a tier of communications channel with a guaranteed latency.

A method for delivering latency sensitive information in synchronization comprising:
determining one or endpoints receiving one or more latency sensitive events;
measuring latency to the one or more endpoints; and
delaying broadcast of the one or more latency sensitive events at least based on the measured latency.

Any of the above aspects, further comprising determining whether the measured latency is above a threshold.

Any of the above aspects, further comprising one or more of: excluding an endpoint from the one or more latency sensitive events, offer purchase of low latency channel, providing information as to measured latency, and offering non-latency sensitive experience.

Any of the above aspects, further comprising delivering or controlling deliver of the one or more latency sensitive events to the one or more endpoints.

Any of the above aspects, further comprising recording information as to then the one or more latency sensitive events is delivered to the one or more endpoints.

Any of the above aspects, wherein the latency measurement is performed with one or more of ping times, NTP (Network Time Protocol), NetFlow analyzer, traceroute, and GPS time data.

Any of the above aspects, further comprising caching the latency sensitive event unit a predetermined time, the predetermined time allowing synchronous delivery of the latency sensitive event to the one or more endpoints.

Any of the above aspects, further comprising grouping endpoints with similar endpoint measurements.

Any of the above aspects, further comprising caching the one or more latency sensitive events at an endpoint for delivery.

A system for presentation of latency sensitive events comprising:
a processor;
a memory;
the processor reading information from the storage about timing for display of a latency sensitive event;
a GPS unit providing timing information; and
a display to display the latency sensitive event, the latency sensitive event delayed to ensure synchronous displaying of the latency sensitive event at a plurality of endpoints.

A computer-readable information storage media having stored thereon instructions that when executed by one or more processors cause to be performed any of the above aspects.

A system on a chip (SoC) including any one or more of the above aspects.

One or more means for performing any one or more of the above aspects.

Any one or more of the aspects as substantially described herein.

For purposes of explanation, numerous details are set forth in order to provide a thorough understanding of the present embodiments. It should be appreciated however that the techniques herein may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, or collocated on a particular node/element(s) of a distributed network, such as a telecommunications network. As will be appreciated from the following description, and for reasons of computational efficiency, the components of the system can be arranged at any location within a distributed network without affecting the operation of the system.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments. Additionally, the exemplary techniques illustrated herein are not limited to the specifically illustrated embodiments but can also be utilized with the other exemplary embodiments and each described feature is individually and separately claimable.

The above-described system can be implemented on a wireless telecommunications device(s)/system, such as an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4G, Bluetooth®, WirelessHD, WiGig, WiGi, 3GPP, Wireless LAN, WiMAX, DensiFi SIG, Unifi SIG, 3GPP LAA (licensed-assisted access), and the like.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a server.

It is therefore apparent that there has at least been provided systems and methods for enhancing and improving communications. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The invention claimed is:

1. A geo-location computer-based game event system that manages latency sensitive user created game events, the system comprising:
　at least one non-transitory computer readable memory storing software instructions and storing a notarized ledger; and
　at least one processor coupled with the at least one memory and configured to execute the software instructions to perform at least the following operations:
　　measuring endpoint latencies to one or more user endpoints over a network;
　　grouping the one or more user endpoints into at least two groups based on the endpoint latencies, wherein a first group of the at least two groups has a first common latency range and a second group of the at least two groups has a second, different common latency range;
　　storing, in the at least one memory, the first common latency range and the second common latency range, information associated with the at least two groups, and information associated with the one or more user endpoints;
　　receiving at least one user created game event and storing the at least one user created game event in the notarized ledger;
　　determining a required presentation time of the at least one user created game event based on the stored first common latency range and based on the second common latency range, and storing the required presentation time in the notarized ledger;
　　determining at least one delay of the at least one user created game event to be sent to the one or more user endpoints based at least on the required presentation time and on the endpoint latencies;
　　generating a non-latency sensitive event for a high latency group selected from the at least two groups based on the at least one delay and the first common latency range and the second common latency range;
　　sending, while accounting for the at least one delay, the at least one user created game event and the required presentation time to the one or more user endpoints in the at least two groups; and
　　enabling presentation of the at least one user created game event and the non-latency sensitive event on the at least two groups at the required presentation time.

2. The system of claim 1, wherein a set of latency rules are adjusted based on a count of the one or more user endpoints to thereby create an adjusted set of latency rules.

3. The system of claim 2, wherein the adjusted set of latency rules are used to determine moving at least one or more user endpoints to a different group of the at least two groups.

4. The system of claim 2, wherein the adjusted set of latency rules includes at least one of the following: a tightened latency constraint, a relaxed latency constraint, or an adjusted latency rule.

5. The system of claim 1, wherein the non-latency sensitive event is the at least one user created game event enabled in a different format.

6. The system of claim 1, wherein at least one of the one or more user endpoints is a remote endpoint.

7. The system of claim 1, wherein one or more endpoints of the one or more user endpoints is associated with a first user.

8. The system of claim 7, wherein the first user comprises at least one of the following: a player, a game player, a spectator, a game spectator, a creator of the at least one user created game event, an administrator, or a developer.

9. The system of claim 1, wherein the at least one user created game event comprises a reward.

10. The system of claim 9, wherein the reward depends on at least one of the following: a user stat, a relative user stat, an event status, a previous data, a distance from the at least one user created game event, a user participation, or at least one of the endpoint latencies.

11. The system of claim 9, wherein the reward comprises one or more of the following: a monetary reward, a team spirit reward, and an enabled game format reward.

12. The system of claim 1, wherein the at least one user created game event is part of one or more of the following environments: a video game, a game, a betting environment, a gambling environment, a digital environment, an eSports environment, and a streaming environment.

13. The system of claim 1, wherein the at least one user created game event comprises one or more of the following types of game events: a number of kills event, a type of kill event, a bounty event, a bounty event on a specific player, a capture a castle event, and a capture the flag event.

14. The system of claim 1, wherein the at least one processor further performs the following operations:
  decrypting the at least one user created game event when the at least one user created game event is to be presented.

15. The system of claim 1, wherein the at least one processor further performs the following operations:
  determining, based on user participation, updated odds or rewards.

16. The system of claim 1, wherein the at least one processor further performs the following operations:
  detecting latency sensitive game events from a game engine.

17. The system of claim 1, wherein the at least one processor further performs the following operations:
  recording latency information associated with the at least two groups on the notarized ledger.

18. The system of claim 17, wherein the latency information is associated with the high latency group.

19. A computer-implemented method for managing latency sensitive user created game events, the method comprising:
  measuring endpoint latencies to one or more user endpoints over a network;
  grouping the one or more user endpoints into at least two groups based on the endpoint latencies, wherein a first group of the at least two groups has a first common latency range and a second group of the at least two groups has a second, different common latency range;
  storing, in at least one memory, the first common latency range and the second common latency range, information associated with the at least two groups, and information associated with the one or more user endpoints;
  receiving at least one user created game event and storing the at least one user created game event in a notarized ledger;
  determining a required presentation time of the at least one user created game event based on the stored first common latency range and based on the second common latency range, and storing the required presentation time in the notarized ledger;
  determining at least one delay of the at least one user created game event to be sent to the one or more user endpoints based at least on the required presentation time and on the endpoint latencies;
  generating a non-latency sensitive event for a high latency group selected from the at least two groups based on the at least one delay and the first common latency range and the second common latency range;
  sending, while accounting for the at least one delay, the at least one user created game event and the required presentation time to the one or more user endpoints in the at least two groups; and
  enabling presentation of the at least one user created game event and the non-latency sensitive event on the at least two groups at the required presentation time.

20. A non-transitory computer-readable information storage media having stored thereon instructions that, when executed by at least one processor, cause the at least one processor to:
  measure endpoint latencies to one or more user endpoints over a network;
  group the one or more user endpoints into at least two groups based on the endpoint latencies, wherein a first group of the at least two groups has a first common latency range and a second group of the at least two groups has a second, different common latency range;
  store, in at least one memory, the first common latency range and the second common latency range, information associated with the at least two groups, and information associated with the one or more user endpoints;
  receive at least one user created game event and store the at least one user created game event in a notarized ledger;
  determine a required presentation time of the at least one user created game event based on the stored first common latency range and based on the second common latency range, and store the required presentation time in the notarized ledger;
  determine at least one delay of the at least one user created game event to be sent to the one or more user endpoints based at least on the required presentation time and on the endpoint latencies;
  generate a non-latency sensitive event for a high latency group selected from the at least two groups based on the at least one delay and the first common latency range and the second common latency range;
  send, while accounting for the at least one delay, the at least one user created game event and the required presentation time to the one or more user endpoints in the at least two groups; and
  enable presentation of the at least one user created game event and the non-latency sensitive event on the at least two groups at the required presentation time.

\* \* \* \* \*